(12) United States Patent
Bhattacharya et al.

(10) Patent No.: US 12,393,645 B2
(45) Date of Patent: Aug. 19, 2025

(54) SYSTEM AND/OR METHOD FOR PERSONALIZED DRIVER CLASSIFICATIONS

(71) Applicant: Credit Karma, LLC, Oakland, CA (US)

(72) Inventors: Sambuddha Bhattacharya, San Francisco, CA (US); Nikhil Mudaliar, San Francisco, CA (US); Rajesh Bhat, San Francisco, CA (US); Udit Gupta, San Francisco, CA (US); Tapan Bhardwaj, San Francisco, CA (US)

(73) Assignee: Credit Karma, LLC, Oakland, CA (US)

( * ) Notice: Subject to any disclaimer, the term of this patent is extended or adjusted under 35 U.S.C. 154(b) by 0 days.

(21) Appl. No.: 18/073,959

(22) Filed: Dec. 2, 2022

(65) Prior Publication Data
US 2023/0177121 A1 Jun. 8, 2023

Related U.S. Application Data

(60) Provisional application No. 63/285,251, filed on Dec. 2, 2021.

(51) Int. Cl.
*G06N 20/00* (2019.01)
*G06F 18/23* (2023.01)
*G06F 18/24* (2023.01)

(52) U.S. Cl.
CPC .............. *G06F 18/24* (2023.01); *G06F 18/23* (2023.01); *G06N 20/00* (2019.01)

(58) Field of Classification Search
CPC .......... G06F 18/24; G06F 18/23; G06N 20/00
See application file for complete search history.

(56) References Cited

U.S. PATENT DOCUMENTS

| 9,900,747 | B1 | 2/2018 | Park |
| 10,703,381 | B2 | 7/2020 | Bender et al. |
| 11,151,813 | B2 | 10/2021 | Matus et al. |
| 2015/0050922 | A1* | 2/2015 | Ramalingam ........... H04W 4/50 455/418 |
| 2017/0105098 | A1 | 4/2017 | Cordova et al. |
| 2018/0338223 | A1* | 11/2018 | Park ..................... H04W 4/027 |
| 2019/0180195 | A1* | 6/2019 | Terry ..................... G06F 40/284 |

(Continued)

*Primary Examiner* — Casey R. Garner
(74) *Attorney, Agent, or Firm* — Dinsmore & Shohl LLP

(57) ABSTRACT

The system can include a plurality of data processing modules (e.g., machine learning models, rule-based models, etc.), which can include: a feature generation module, a Driver versus Passenger (DvP) classification module, a validation module, an update module, and/or any other suitable data processing modules. The system can optionally include a mobile device (e.g., such as a mobile cellular telephone, user device, etc.) and/or can be used in conjunction with a mobile device (e.g., receive data from an application executing at the mobile device and/or utilize mobile device processing, etc.). However, the system can additionally or alternatively include any other suitable set of components. The system functions to facilitate execution of method S100. Additionally or alternatively, the system functions to classify a role of a mobile device user (e.g., driver or passenger; driver or nondriver; etc.) for a vehicle trip and/or determine a semantic label for the vehicle trip.

20 Claims, 10 Drawing Sheets

(56) References Cited

U.S. PATENT DOCUMENTS

2019/0311289 A1* 10/2019 Nguyen ............... G07C 5/0816
2021/0146785 A1*  5/2021 Wang .................... G06N 20/00
2021/0163016 A1   6/2021 Matus et al.
2022/0050921 A1*  2/2022 LaFever ............. H04L 63/0407
2022/0080976 A1*  3/2022 Genovese ............... H04W 4/48

* cited by examiner

SYSTEM AND/OR METHOD FOR PERSONALIZED DRIVER CLASSIFICATIONS

CROSS REFERENCE TO RELATED APPLICATIONS

This application claims the benefit of U.S. Provisional Application No. 63/285,251, filed 2 Dec. 2021, which is incorporated herein in its entirety by this reference.

TECHNICAL FIELD

This invention relates generally to the vehicle telematics field, and more specifically to a new and useful driver classification system and/or method in the vehicle telematics field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
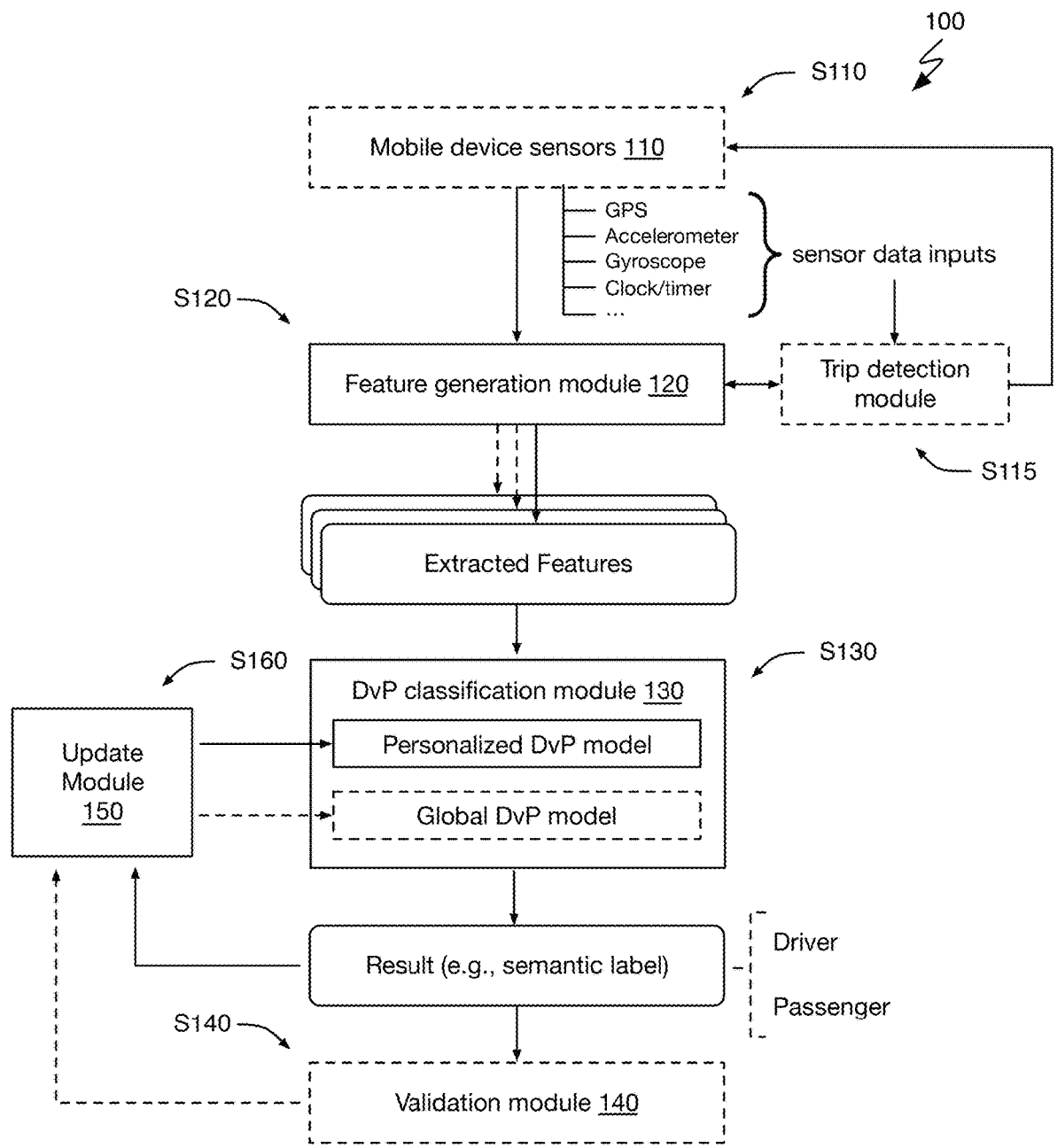
FIG. 1 is a schematic representation of a variant of the system.

The system 100, an example of which is shown in FIG. 1, can include a plurality of data processing modules (e.g., machine learning models, rule-based models, etc.), which can include: a feature generation module, a Driver versus Passenger (DvP) classification module, a validation module, an update module, and/or any other suitable data processing modules. The system can optionally include a mobile device (e.g., such as a mobile cellular telephone, user device, etc.) and/or can be used in conjunction with a mobile device (e.g., receive data from an application executing at the mobile device and/or utilize mobile device processing, etc.). However, the system 100 can additionally or alternatively include any other suitable set of components. The system 100 functions to facilitate execution of method S100. Additionally or alternatively, the system 100 functions to classify a role of a mobile device user (e.g., driver or passenger; driver or nondriver; etc.) for a vehicle trip and/or determine a semantic label for the vehicle trip.

Figure 2:
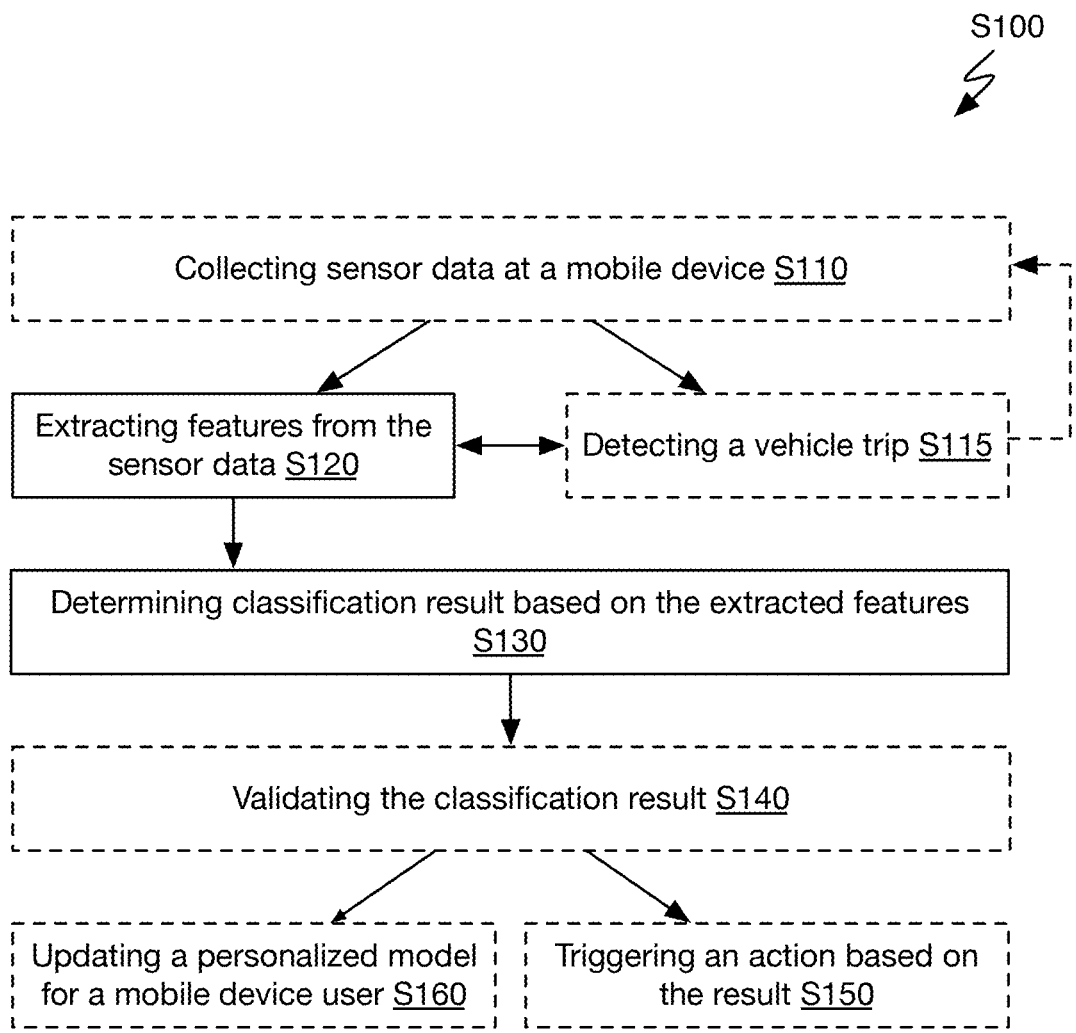
FIG. 2 is a diagrammatic flow chart representation of a variant of the method.

The method S100, an example of which is shown in FIG. 2, can include: optionally collecting sensor data at a mobile device S110; detecting a vehicle trip S115; extracting features from the sensor data S120; determining a classification result based on the extracted features S130; optionally validating the classification result S140; optionally triggering an action based on the classification result S150; and optionally updating a personalized model for a mobile device user S160. However, the method S100 can additionally or alternatively include any other suitable elements. The method functions to classify a role of a mobile device user (e.g., driver or passenger; driver or nondriver; etc.) for a vehicle trip and/or generate a semantic label for the vehicle trip. Additionally or alternatively, the method can function to generate and/or improve a personalized DvP classification model for a mobile device user.

In variants, the system and/or method can be used to detect a vehicle trip at a mobile device and/or, during the trip, determine if a user of the mobile device is a driver of the vehicle (or a nondriver/passenger) without any direct inputs from a user or communication with the vehicle. Additionally, the system and/or method may facilitate classification of a vehicle with the mobile device arranged arbitrarily (e.g., without a known/fixed position, movably) relative to the vehicle (e.g., in a user's pocket, backpack, mounted to a dash/handlebar, etc.).

In variants, the system and/or method can be used to classify/label trips for a mobile device user for any suitable set(s) of vehicles and/or transportation modalities which can include: motorway vehicle trips (e.g., car, motorcycle, commercial vehicle, vehicles with 3 or more axles, trucks, buses, etc.), land-based vehicle trips (e.g., human powered vehicles, scooters, cars, busses, trains, etc.), motor-vehicle trips, animal-powered trips, marine vessel trips, aircraft trips, and/or any other suitable vehicle trips and/or transport modalities. However, the system and/or method can be used to classify/label trips associated with any other suitable set of vehicular transport modalities.

In variants, the system and/or method can be used in conjunction with and/or in addition to the driver characteristic determination system/method described in U.S. application Ser. No. 16/022,120, filed 28 Jun. 2018, which is incorporated herein in its entirety by this reference.

Additionally, it is understood that the method, method elements, processing modules, and/or models (e.g., global model, personalized model) herein, referenced in relation to DvP classification or otherwise, can be applicable to various forms of (user) activity classification as they pertain to mobile device usage, vehicle behavior patterns, user habits, and/or other characterizations of user activities. For example, the personalized model approach to classification may be deployed at (relatively) higher levels of accuracy in the context of user activity characterizations when the user exhibits consistently distinct behavior across different activity contexts. In the case of DvP characterization, for example, users that interact with the mobile device substantially differently and/or exhibit distinct behavior patterns between driver and passenger context (e.g., number of in-trip screen interaction patterns, screen time patterns, phone arrangement and/or mounting position patterns, Bluetooth connectivity patterns, travel patterns, etc.) when compared to users which exhibit substantially similar behavior patterns in a driver and passenger context (e.g., leaving mobile device in a pocket or backpack without interacting with it; departing from and/or traveling to a similar set of locations; etc.). Similarly, the personalized and global model approach can be utilized for classification/labeling of user behavioral patterns associated with various vehicles, transportation modalities, and/or mobile device contexts.

1.1 Variants.

In a first set of variants, a method can include: collecting sensor data for a vehicle trip at a mobile device, wherein the mobile device is associated with a user; generating derived signals (i.e., features) for the trip based on the sensor data; qualifying a personalized model for the user based on the derived signals (e.g., using a static calculation/filter based on the time and starting location of the trip), wherein the personalized model includes a hierarchical clustering model for the user (e.g., predetermined based on a user history); generating a personalized prediction based on a proximity to semantically labeled historical trips within the hierarchical clustering model for the user; determining a semantic result for the trip (e.g., "driver" label for the trip; "passenger" label for the trip) based on the personalized prediction. The semantic result can optionally be verified by the user and, in response, the method can include updating the hierarchical clustering model for the user with the derived signals for the trip and the (verified) semantic result/label.

Figure 8:
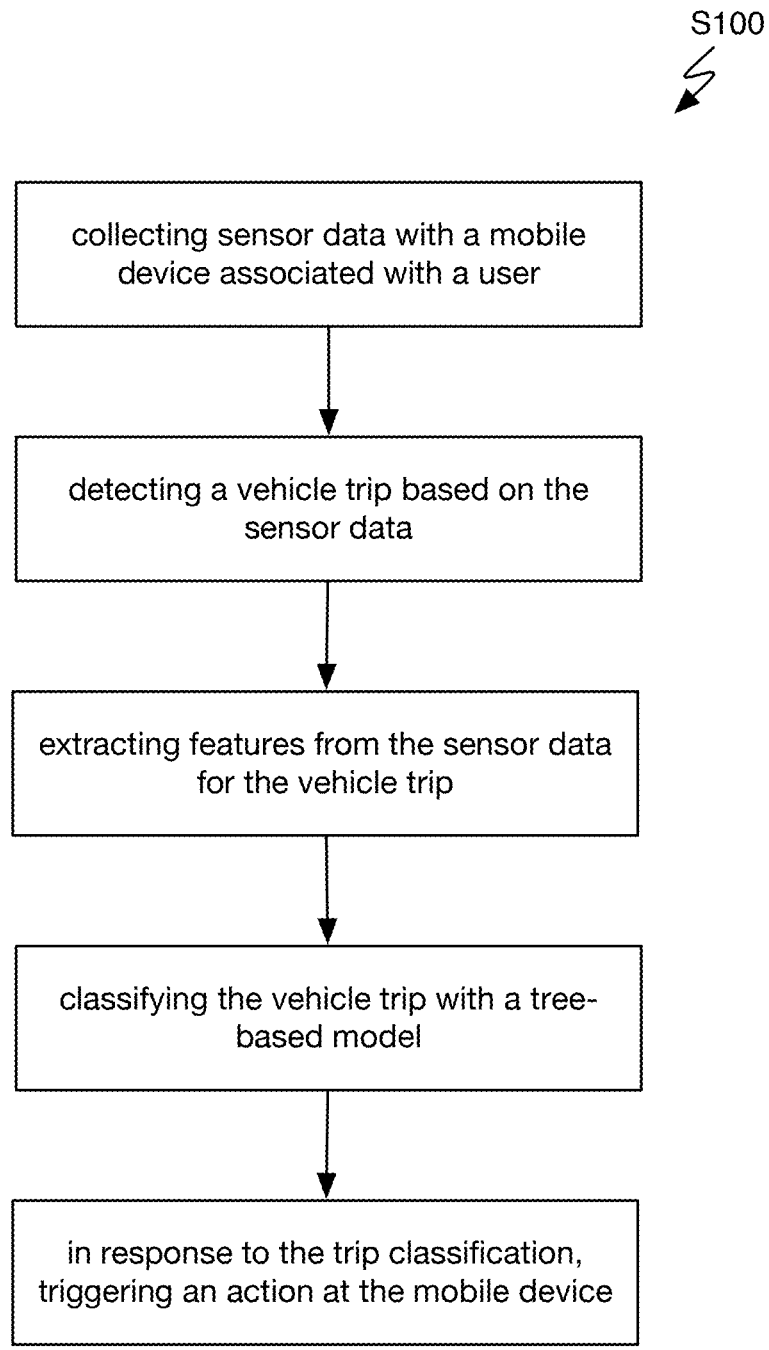
FIG. 8 is an example flow chart diagram for a variant of the method.

In a second set of variants (e.g., an example is shown in FIG. 8), nonexclusive with the first set, a method for mobile driver-versus-passenger classification, includes: collecting sensor data with a mobile device associated with a user; detecting a vehicle trip based on the sensor data; extracting features from the sensor data for the vehicle trip; based on the extracted features, classifying the vehicle trip with a tree-based model including: a personalized driver-versus-passenger (DvP) model and a global DvP model, the personalized DvP model including a hierarchical clustering model for the user of the mobile device based on historical vehicular trips completed by the user; and in response to the trip classification, triggering an action at the mobile device.

Figure 9:
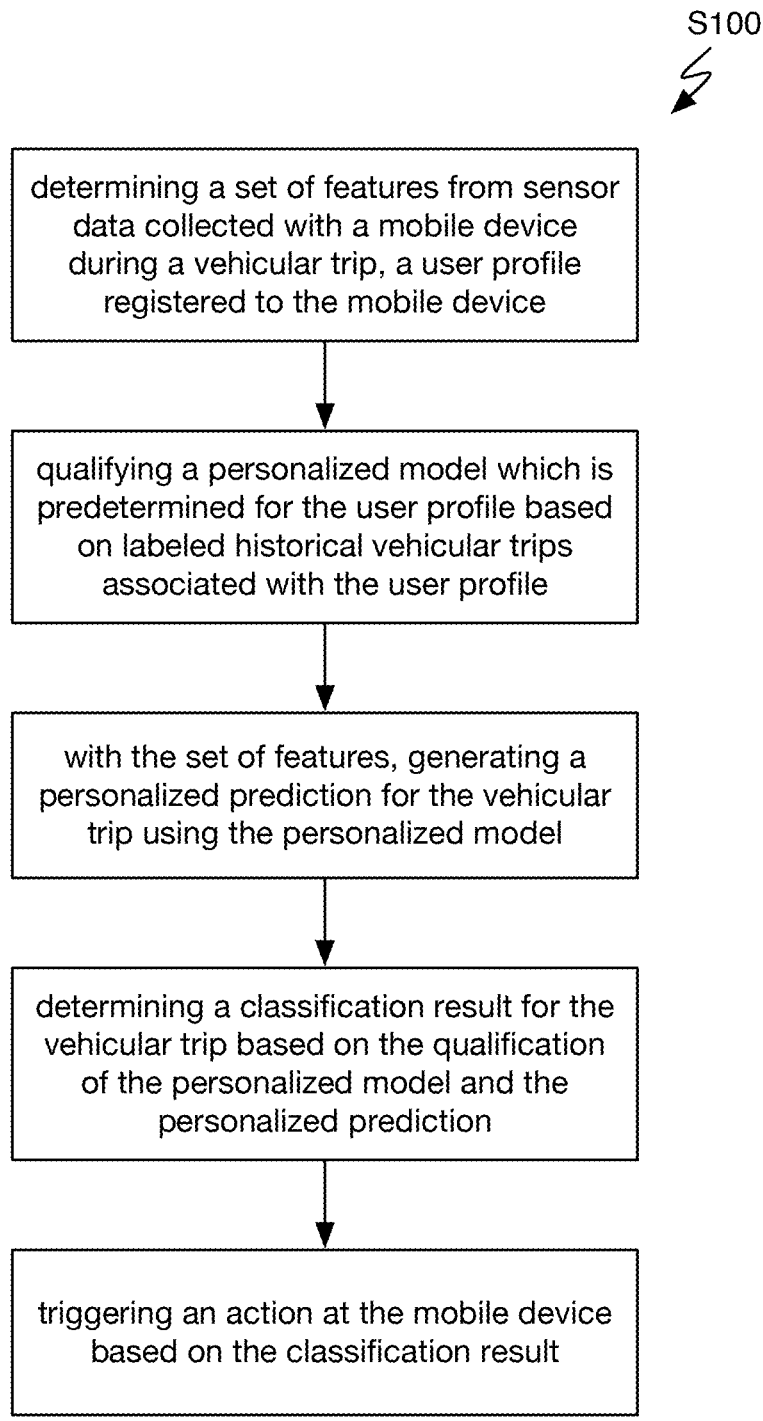
FIG. 9 is an example flow chart diagram for a variant of the method.

In a third set of variants (e.g., an example is shown in FIG. 9), nonexclusive with the first and second sets, the method includes: determining a set of features from sensor data collected with a mobile device during a vehicular trip, a user profile registered to the mobile device; qualifying a personalized model which is predetermined for the user profile based on labeled historical vehicular trips associated with the user profile; with the set of features, generating a personalized prediction for the vehicular trip using the personalized model; determining a classification result for the vehicular trip based on the qualification of the personalized model and the personalized prediction; and triggering an action at the mobile device based on the classification result.

2. Benefits

Variations of the technology can afford several benefits and/or advantages.

First, variations of this technology can leverage non-generic location data (e.g., location datasets, GPS data, device orientation, device arrangement within a vehicle, etc.), motion data (e.g., motion datasets, accelerometer data, gyroscope data, etc.), and/or user device data (e.g., Bluetooth connectivity, etc.) to conveniently and unobtrusively determine whether a device user is a passenger or driver of a vehicle during a vehicle trip. Classifying a mobile device user as a driver or passenger can be used to provide more relevant/accurate user content such as: insurance content, service offerings, advertising based on driving characteristics, and/or can facilitate more accurate usage-based or behavior-based insurance offerings. In examples, the system and/or method can facilitate usage and/or behavior-based insurance offerings (or validation) without requiring a user to purchase additional hardware (e.g., a specialized onboard device for driver monitoring, a purpose-built such device, dedicated vehicle mounted hardware, etc.). In variants, the technology can be used to determine a semantic label and/or mobile device user role associated with a trip detected as described in U.S. application Ser. No. 16/201,955, filed Nov. 27, 2018, which is incorporated herein in its entirety by this reference.

Second, variations of this technology can distinguish between drivers (e.g., vehicle operators, users who are responsible for driving the vehicle, etc.) and passengers (e.g., users who occupy a vehicle during operation without driving, front passengers, rear passengers, etc.) with greater accuracy, thereby minimizing the detection of false positives. Further, the technology can provide accurate user classification while allowing a user to have flexibility in placement of their mobile computing device in relation to the vehicle, such as when the mobile device is in a user's pocket/hand, mounted within the car, arranged within a cup holder, and/or in other location(s) within the vehicle. Moreover, the technology can leverage a user history (e.g., driving history, vehicle trip history) and historical trip labels to personalize a classification model to a particular user and/or to a user's behavioral patterns. As an example, device usage characteristics (e.g., screen interactions, connecting to Bluetooth, mounting device on a vehicle dash, etc.) for a particular user can be used to distinguish between the user's role in a vehicle (e.g., driving, sitting in a passenger seat, etc.).

Third, variations of this technology can automatically initiate user-related actions in response to determination of user classification (e.g., driver or passenger). User-related actions can include one or more of: controlling the user device, sending a notification to the user or a related entity, generating user-specific content, and/or other suitable user-related actions. Further, in examples, the type of initiated user-related action can be tailored to the particular user characteristic based on movement data and/or supplemental data. In examples, the technology can include a software development kit for third-parties to integrate the user characteristic determination features, thereby enabling third-parties to leverage user characteristics and related data for purposes of driving education, ride sharing, valet services, navigation, roadside assistance, insurance processing, emergency services, and/or other suitable services.

Fourth, variations of this technology can characterize/classify a user in real-time (e.g., instantaneously, substantially real-time, near real-time, etc.), which can facilitate a timely provision (e.g. during the in-trip time period, immediately following an accident, etc.) of appropriate messages (e.g., driver specific messages, passenger specific messages, etc.) to the user.

Fifth, variations of this technology can provide technical solutions necessarily rooted in computer technology (e.g., utilizing computational models to determine user characteristics from non-generic location and/or motion datasets collected at mobile computing devices, etc.) to overcome issues specifically arising with computer technology (e.g., issues surrounding how to leverage movement data collected by a mobile computing device to determine user characteristics, and/or to automatically initiate user-related actions for responding to user characterizations, etc.).

Figure 6A:
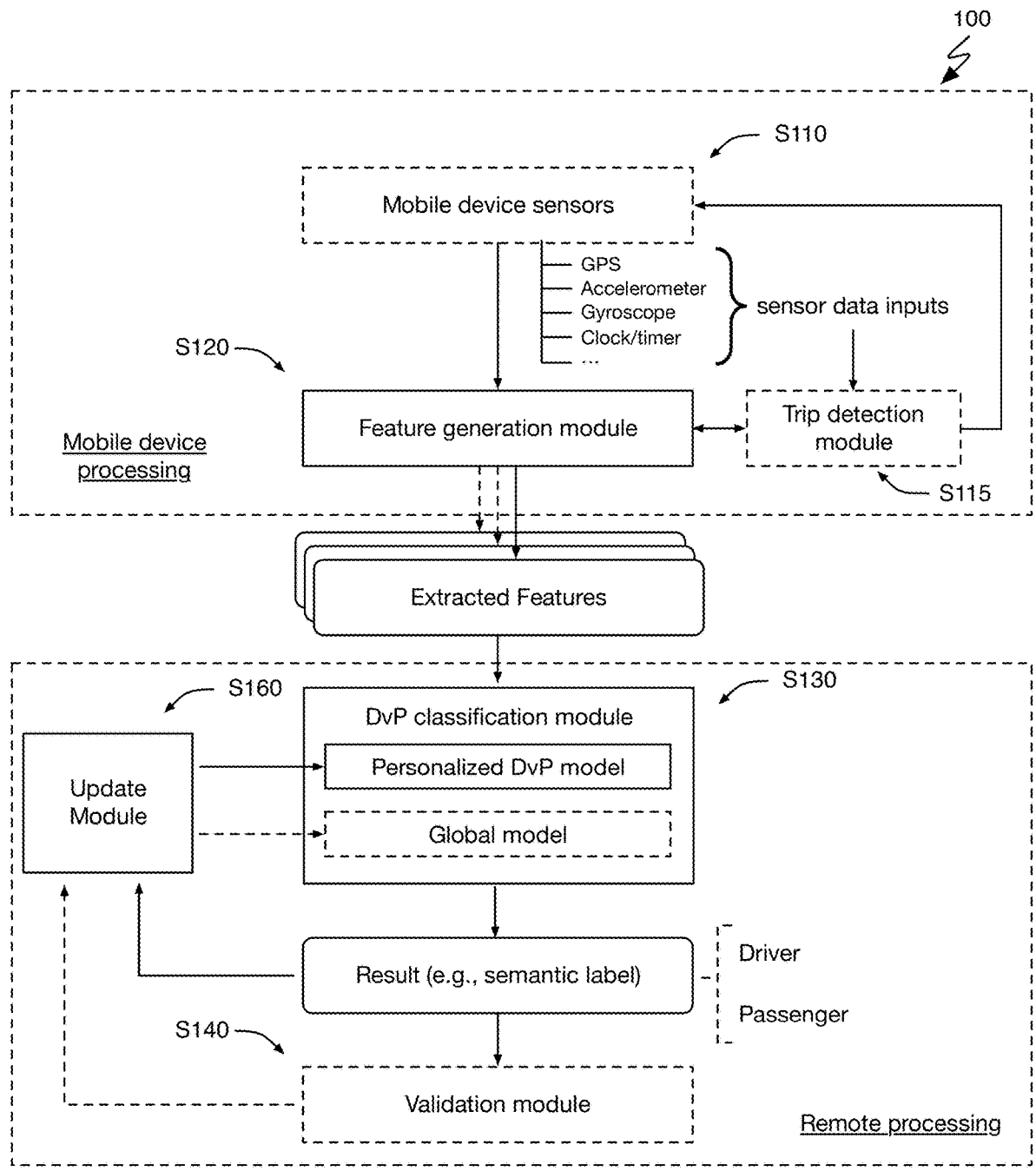
FIGS. 6A-6B are schematic representations of a first and second example of a variant of the system, respectively.
Figure 6B:
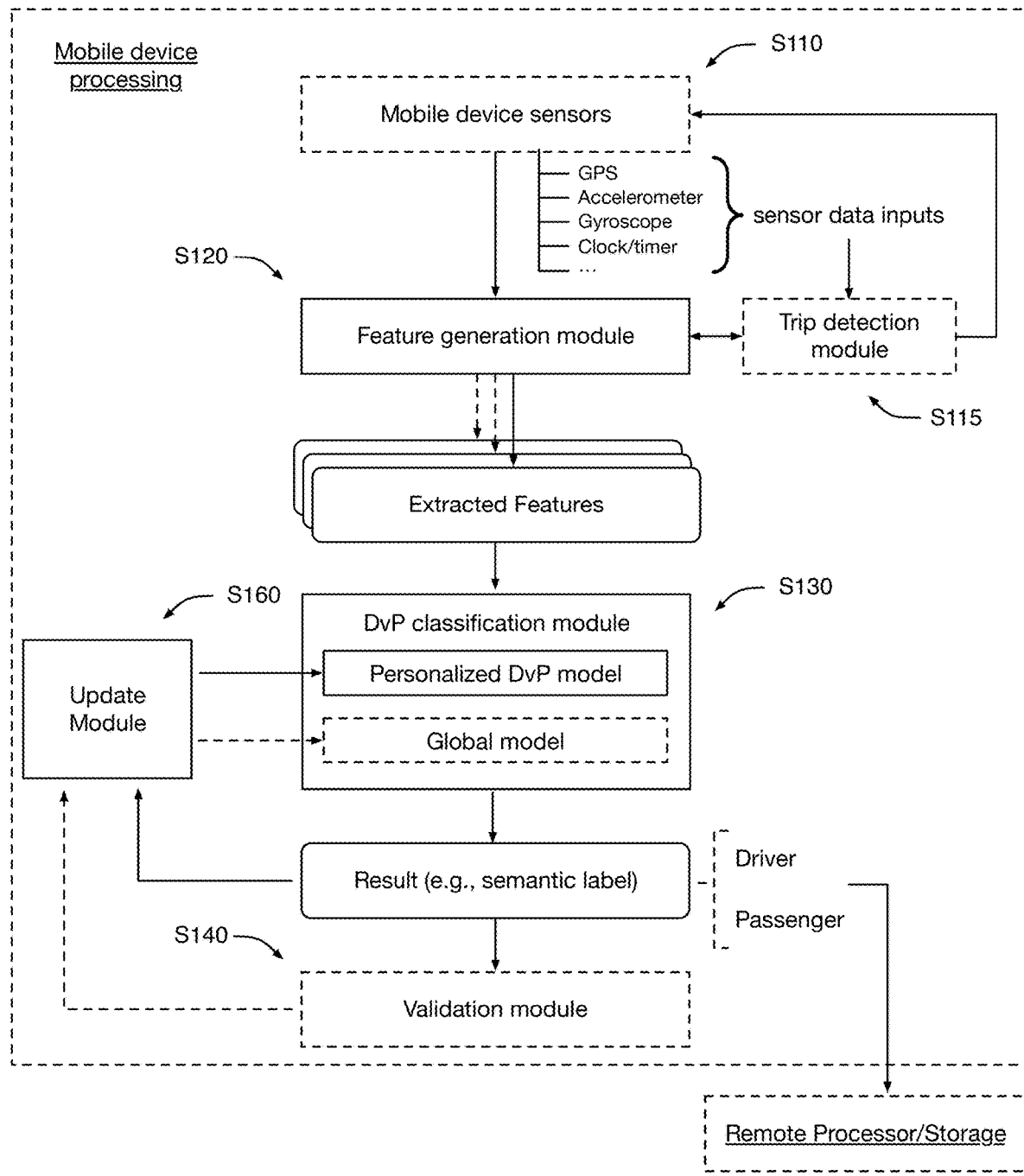

Sixth, variations of this technology can leverage specialized computing devices (e.g., computing devices with GPS location capabilities, computing devices with motion sensor functionality, etc.) to collect specialized datasets for characterizing users in the vehicle (e.g., as one of a driver or a passenger). In variants, specialized datasets can be used to classify mobile device users as drivers/passengers (e.g., via personalized user models) without transmitting descriptive personal data from a mobile device. For instance: descriptive personal user data collected at a user device (e.g., which may include movement data, device connectivity data, and/or other types of data) can be converted into one or more non-descriptive features which may be useful for the purpose of characterizing whether the user is a driver or passenger (e.g., via a personalized DvP model for the user), but from which the personal user data cannot be recovered. In such cases, classification using a personalized model and features extracted (locally at the mobile device) for a trip can be performed without transmitting or remotely storing descriptive user data (examples are shown in FIGS. 6A and 6B). As an example, the features can include a fraction of a trip during which a mobile device is mounted to a dashboard, a parameter which is 'non-descriptive' of a user's identity. However, computing devices and/or any other suitable user data can be leveraged, transmitted, and/or stored.

Seventh, variations of this technology can enable a user's in-trip behavior to be correctly attributed to the user's role in the trip (e.g., whether the user is a driver or a passenger), which can enable more accurate assessment of the user's risk profile. For example, a user that utilizes a ride share service for transport can be driven by risky drivers as a passenger, and the method can enable the user to avoid penalization of passengers riding in a vehicle handled (by a separate driver) in an aggressive/risky manner.

However, variations of this technology can additionally or alternately provide any other suitable benefits and/or advantages.

3. System

The system 100, an example of which is shown in FIG. 1, can include a plurality of data processing modules, which can include: a feature generation module 120, a Driver versus Passenger (DvP) classification module 130, a validation module 140, an update module 150, and/or any other suitable data processing modules. The system can optionally include a mobile device (e.g., such as a mobile cellular telephone, user device, etc.) and/or can be used in conjunction with a mobile device 102 (e.g., receive data from an application executing at the mobile device and/or utilize mobile device processing, etc.). However, the system 100 can additionally or alternatively include any other suitable set of components. The system 100 functions to facilitate execution of method S100. Additionally or alternatively, the system 100 functions to classify a role of a mobile device user (e.g., driver or passenger; driver or nondriver; etc.) for a vehicle trip and/or semantic label for the vehicle trip.

The system can optionally include and/or be configured to interface with a mobile device 102 (e.g., user device), which functions to collect sensor data (such as in accordance with Block S110 of the method). Examples of the mobile device 102 include a tablet, smartphone, mobile phone, laptop, watch, wearable devices, or any other suitable user device. The mobile device can include power storage (e.g., a battery), processing systems (e.g., CPU, GPU, memory, etc.), sensors, wireless communication systems (e.g., a WiFi transceiver(s), Bluetooth transceiver(s), cellular transceiver(s), etc.), or any other suitable components. The sensors 110 of the mobile user device can include vehicular movement sensors, which can include: location sensors (e.g., GPS, GNSS, etc.), inertial sensors (e.g., IMU, accelerometer, gyroscope, magnetometer, etc.), motion sensors, force sensors, orientation sensors, altimeters, and/or any other suitable movement sensors; user-facing sensors, which can include: cameras, user input mechanisms (e.g., buttons, touch sensors, etc.), and/or any other suitable user-facing sensors; and/or any other suitable sensors. However, the system can include and/or be used with any other suitable mobile device(s).

The data processing modules function to facilitate execution of S100 and/or sub-elements therein. Data processing modules can include local processing elements (e.g., executing at the user device and/or within an application of the mobile device), remote processing elements (e.g., executed at a remote server, cloud processing etc.), and/or any other suitable data processing. Data processing modules can be centralized and/or distributed (e.g., across multiple processing nodes), and can be executed at the same endpoint or different endpoints. In variants, S100 can be entirely performed at the mobile device (e.g., an example is shown in FIG. 6B; edge computing; etc.). Alternatively, a portion of S100 elements can be executed at the mobile device and a remainder can be executed at a remote server based on a trigger or call from the mobile device (e.g., an example is shown in FIG. 6A). However, processing of S100 can be otherwise suitably distributed between system endpoints and/or processing nodes.

In variants, the data processing modules can include a feature generation module 120, which functions to extract features from the data collected by the mobile device in accordance with Block S120 of the method. The feature generation module can extract features from the sensor data according to a predetermined set of rules, heuristics, or other techniques. In variants, the features generation module can additionally or alternatively function to convert descriptive personal user data collected at a user device (e.g., which may include movement data, device connectivity data, and/or other types of data) into one or more non-descriptive features which may be useful for the purpose of characterizing whether the user is a driver or passenger (e.g., via a personalized user model), but from which personal user data cannot be recovered. The feature generation module is preferably local and/or executed on the mobile user device, but can be distributed between any suitable processing endpoints and/or otherwise suitably executed. However, the system can include any other suitable feature generation module(s).

In variants, the data processing modules can include a Driver versus Passenger (DvP) classification module 130 which functions to classify/label user trips in accordance with Block S130 of the method. The DvP classification module preferably includes a personalized DvP model (e.g., specifically generated for the user of the mobile device based on the user's history), but can additionally or alternatively include a global DvP model.

The personalized DvP classification model is preferably a clustering model, such as a hierarchical clustering model, but can additionally or alternatively be include suitable personalized model/classifier(s), such as: a binary classifier, a multi-class classifier, a clustering model (e.g., hierarchical clustering model), an ML model, a regression model, a neural network model (e.g., DNN, CNN, RNN, etc.), a cascade of neural networks, an ensemble of neural networks, compositional networks, Bayesian networks, Markov chains, predetermined rules, probability distributions, heuristics, probabilistic graphical models, and/or other model(s) which are personalized for the particular user. For example, the personalized DvP classification model can be predetermined and/or pre-trained for the user based on prior iterations of the method S100, and/or can be predetermined for the user based on the user profile and/or historical driving trips (e.g., and features derived therefrom). In an example, the personalized DvP model is a hierarchical clustering model (e.g., populated based on a user history).

The global DvP classification model can include any suitable models, such as: a binary classifier, a multi-class classifier, a clustering model (e.g., hierarchical clustering model), an ML model, a regression model, a neural network model (e.g., DNN, CNN, RNN, etc.), a cascade of neural networks, an ensemble of neural networks, compositional networks, Bayesian networks, Markov chains, predetermined rules, probability distributions, heuristics, probabilistic graphical models, tree-based models, and/or other models.

In an example, the global DvP model can employ the system, classification techniques, and/or method elements as described in U.S. application Ser. No. 16/022,120, filed Jun. 28, 2018, which is incorporated herein in its entirety by this reference. In a second example, the global DvP model is an ML-based classifier which is pretrained using historical data from a plurality of users (e.g., population of users; trips from greater than 1000 users; population of users which can include or exclude the user of the mobile device; etc.).

However, the system can include any other suitable DvP classification module(s) and/or models thereof.

Figure 7:
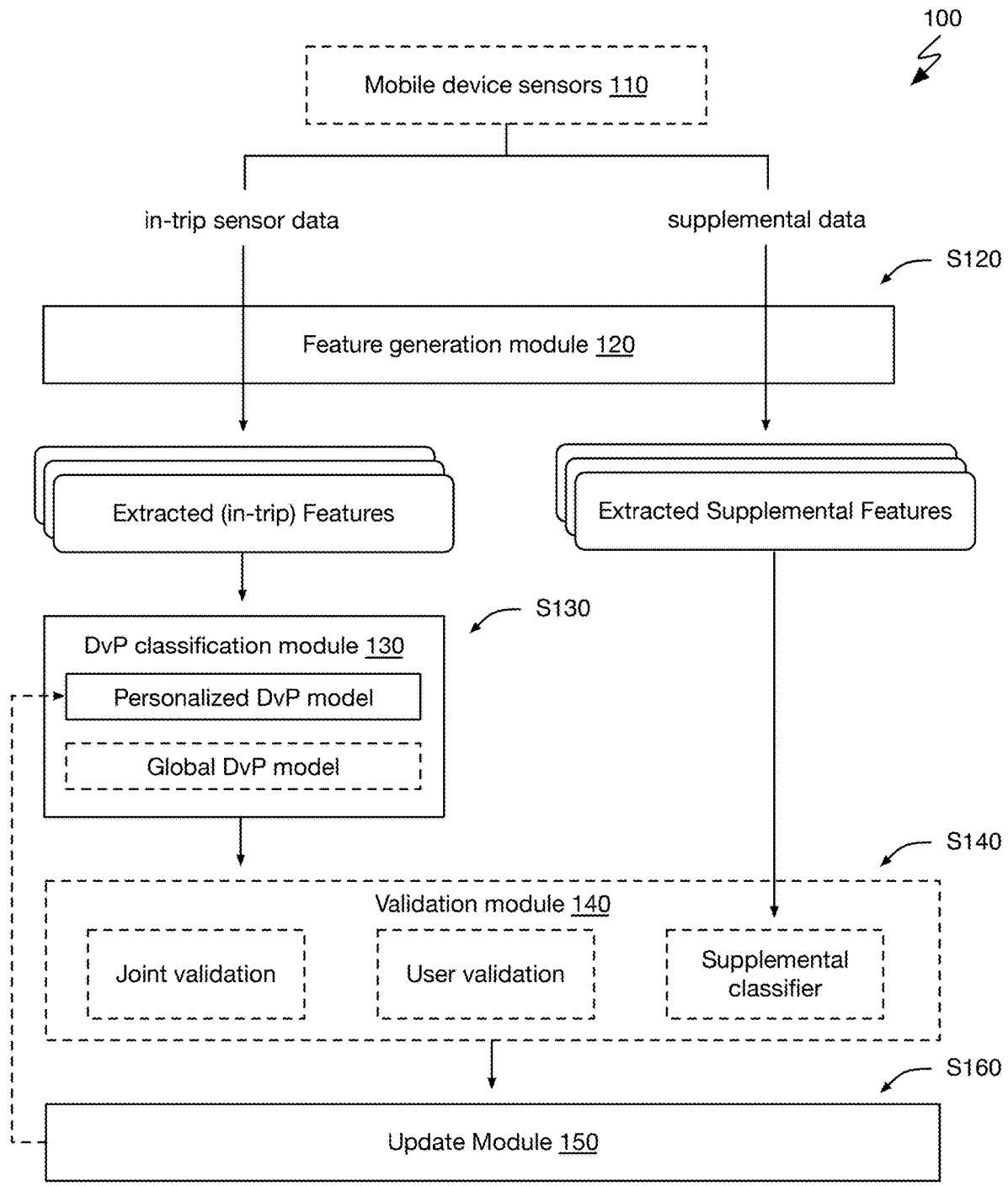
FIG. 7 is a schematic representation of a variant of the system.

In variants, the data processing modules can include a validation module 140, which functions to validate a result for a trip (e.g., from the DvP classification module Additionally or alternatively, the validation module can function to execute with Block S140 of the method. Additionally or alternatively, the validation module can validate the classification result for a particular trip with one or more of: a user validation (e.g., via the mobile device or an API), a joint validation (e.g., based on a joint probability of the personalized and global DvP models), and/or a supplemental classifier; an example of which is shown in FIG. 7. However, the set of data processing modules can include any other suitable validation module and/or can otherwise exclude a validation module.

In variants, the data processing modules can include an update module 150, which functions to update, retrain, and/or expand a model of the DvP classification module. Additionally or alternatively, the validation module can function to execute with Block S160 of the method. However, the set of data processing modules can include any other suitable update module and/or can otherwise exclude an update module.

In variants the system can include or be used with a trip detection module, such as the trip detection system as described in U.S. application Ser. No. 16/201,955, filed Nov. 27, 2018, which is incorporated herein in its entirety by this reference. Additionally or alternatively, the system can facilitate execution of any or all portions of method S100 in response to a trip detection by a trip detection system. Additionally or alternatively, the system can be configured to execute S100 during a vehicular trip, asynchronously with vehicle trips and/or vehicular navigation, and/or with any other suitable timing.

However, the system can include any other set of data processing modules.

However, the system can include any other suitable components.

4. Method

The method S100, an example of which is shown in FIG. 2, can include: optionally collecting sensor data at a mobile device S110; detecting a vehicle trip S115; extracting features from the sensor data S120; determining a classification result based on the extracted features S130; optionally validating the classification result S140; optionally triggering an action based on the classification result S150; and optionally updating a personalized model for a mobile device user S160. However, the method S100 can additionally or alternatively include any other suitable elements. The method functions to classify a role or activity of a mobile device user (e.g., driver or passenger; driver or nondriver; etc.) for a vehicle trip and/or generate a semantic label for the vehicle trip. Additionally or alternatively, the method can function to generate and/or improve a personalized (DvP) classification model for a mobile device user.

Collecting sensor data at a mobile device S110 functions to collect data to be used to determine a vehicle trip and/or classify a vehicular transportation modality. Sensor data is preferably collected at the mobile device and/or sensors therein (e.g., movement sensors, location sensors, user-facing sensors, etc.). Data collected during S210 can include: location data (e.g., latitude/longitude, GPS, GPS accuracy, etc.), acceleration data (e.g., 6 axes, linear, rotational, etc.), velocity (e.g., integrated from inertial acceleration data), orientation (e.g., relative to gravity), data from any other suitable mobile device sensors, vehicle connection data, and/or any other suitable data. Mobile device sensor data can be collected continuously, periodically, in response to a trip detection (e.g., in accordance with Block S115), synchronously, asynchronously (e.g., between various mobile device sensors), and/or with any other suitable timing. In variants, S210 can include storing data locally at the mobile device and/or transmitting mobile device sensor data to a remote endpoint, such as a remote processing and/or data storage system (e.g., remote server, cloud processing, etc.). Data can be collected/stored in a time domain (e.g., timestamped measurements, ordered/sequential measurements) and/or frequency domain (e.g., for vibration data, such as accelerations over a collection interval/period), or can be otherwise suitably indexed/stored. Alternatively, sensor data may not be stored after features are extracted and/or may only be stored locally at the user device (during a trip).

However, sensor data can be otherwise suitably collected.

Optionally detecting a vehicle trip S115 functions to serve as a trigger for sensor data collection with one or more sensors of the mobile device, feature generation, and/or classification of the trip (e.g., assigning a semantic label and/or role for user of mobile device). A vehicle trip can be determined based on the sensor data collected in S110 and/or a subset thereof. In one variant, a vehicle trip can be detected based on a movement of the mobile device by the method described in U.S. application Ser. No. 16/201,955, filed Nov. 27, 2018, which is incorporated herein in its entirety by this reference. In an example, a vehicle trip can be determined based on a subset of the mobile device sensors (e.g., accelerometer, geofence trigger, etc.) and trigger data collection using a second subset of sensors of the mobile device.

S115 can detect a trip while the trip is ongoing (e.g., which may facilitate trip classification contemporaneously with the trip), but can additionally or alternatively detect a full duration of a trip, after completion of the trip and/or based on completion of the trip (e.g., which may facilitate trip classification based on an entire duration of the trip). Trip detection is preferably performed locally (e.g., onboard the mobile device), but can alternatively be performed remotely and/or at any other suitable endpoint(s). In a specific example, S115 can detect a trip based on coarse sensor data (e.g., low data collection frequency, based on a subset of sensors, with minimal power and/or processing bandwidth utilization, etc.) and can trigger collection of granular sensor data during a trip (e.g., which may continue for a duration of the trip, until a termination of the trip is detected, until a DvP classification is determined, etc.).

In variants, detecting the vehicle trip can include: at an application of the mobile user device operating in an idle state, determining satisfaction of a geofence trigger; and in response to determining satisfaction of the geofence trigger, executing a set of hierarchical tests according to a tree-based model to detect a start of the vehicle trip. In an example, the set of hierarchical tests are based on data collected by at least one of: a motion sensor or a location sensor of the mobile user device.

In an example, the S100 includes automatically detecting the vehicular trip based on movement of the mobile device (e.g., and/or trip classification can be based on the automatic detection of the vehicular trip based on the movement of the mobile device).

However, a vehicle trip can be otherwise suitably determined. Alternatively, the method can be executed independently of and/or without detection of a vehicle trip.

Extracting features from the sensor data S120 functions to provide a parametric characterization which can be used as a basis for trip classification (e.g., with existing models; against historical data, etc.).

Additionally or alternatively, extracting features can function to irreversibly convert granular/descriptive user data into one or more non-descriptive parameters (e.g., which may be used to classify trips, but may not be useful for identifying individuals; not linked to personal identity information [PII]; etc.). As an example, the fraction of time during a trip that a mobile device is mounted to a dashboard is a parameter which may be used to determine if the user of the mobile device is a driver or a passenger during the trip, and this parameter is 'non-descriptive' of a user identity. As a second example, departure/destination locations (e.g., GPS coordinates and/or a user-provided label such as "home" or "work") can be descriptive of a user, whereas generic indices (e.g., abstracted indices such as "user location 1", "user location 2", etc.) and/or irreversibly transformed coordinates (e.g., hashed/encrypted at the user device, etc.) may not be descriptive/identifying of the user. As a third example, Bluetooth connection and disconnection patterns can be a non-descriptive parameter and/or may not be used to identify a user identity. As a fourth example, vehicle entry or egress pattern parameters can be non-descriptive parameters. However, any other suitable non-descriptive features can be extracted. Additionally or alternatively, extracted features can include descriptive features (e.g., in cases where the method may be performed entirely locally on the mobile user device, for example; where data may be transmitted/stored securely, etc.), and/or any other suitable features can be extracted.

Features (interchangeably referenced herein with "derived signals") can relate set(s) of sensor data which can include: time domain data, frequency domain data, localization data, motion data, user behavior data (e.g., device utilization, etc.), device utilization data, device connectivity data, and/or any other suitable sensor data and/or mobile device data. Features can include: statistical features (e.g., central tendency metrics, aggregate parameters, statistical parameters, etc.), behavioral features (e.g., utilization patterns, etc.), movement features, location features, contextual features (e.g., based on stored historical or external datasets; trip start/end locations can defined contextually a based on a locally stored and/or predefined "user home", "work", or "last known parking location" as opposed to a specific GPS coordinate position; indexed locations; hashed/transformed coordinate positions, etc.) and/or any other suitable data features. Features can be extracted from a single sensor or a combination of multiple sensors (e.g., multiple sensor types, such as an accelerometer and a gyroscope). Features can be generated algorithmically according to a predetermined set of rules/heuristics (e.g., manually assigned, pre-generated by a computer, etc.), using one or more pre-trained models (e.g., machine learning [ML] models, neural networks, fully convolutional network [FCN], convolutional neural network [CNN], recurrent neural network [RNN], artificial neural network [ANN], etc.), polynomial regression, and/or with any other suitable techniques. Features can be constructed from time segments of sensor data spanning: a full duration of a vehicle trip, a partial duration of a vehicle trip (e.g., between trip detection and/or initiation and an instantaneous time, fixed time window, dynamic time window, etc.), and/or any other suitable duration(s). Features can include: trip pattern parameters (e.g., trip duration, contextual starting location, etc.), device arrangement parameters (e.g., proportion of trip with dash mounted mobile device, proportion of trip "in hand"), device usage parameters (e.g., proportion of trip with user looking at screen or with screen brightened, etc.), driving event parameters (e.g., number/frequency of braking, turning, lane change events, etc.), vehicle entry pattern parameters (e.g., clockwise door open direction, passenger-side entry, driver-side entry, etc.), wireless connectivity parameters (e.g., fraction of trip with established vehicle Bluetooth connection; established home/office WiFi connection, etc.), non-descriptive parameters (e.g., dissociated from user's personal identity), descriptive parameters (e.g., partially descriptive parameters; a location and a time-stamp of trip start; etc.), movement parameters, and/or any other suitable parameters/features. More preferably, the features can include in-trip features (e.g., associated with a time period of vehicular traversal and/or a duration of the vehicular trip), but can additionally or alternatively include pre-trip/post-trip features (e.g., entry/egress characteristics), extra-trip features (e.g., for a time period not including the trip itself), supplemental features (e.g., based on an activity context or classification surrounding the trip, such as entry/egress direction; based on an orthogonal/independent set of signals and/or information, such as gravity direction and/or gyroscopic device movement after trip completion), inter-trip features (e.g., where a relationship between trips and/or combination/multi-modal trips may be characterized), and/or any other suitable features. The set of features is preferably fixed and/or predefined (e.g., based on a set of inputs used to train/update the personalized classification model). The set of features can include a number of features (e.g., size of feature set) which is: less than 3, 3, 5, 6, 8, 10, 12, more than 12, any range bounded by the aforementioned values, and/or any other suitable number of features/parameters.

Additionally, the features can include any or all of the features determined/extracted as described in U.S. application Ser. No. 17/959,067, filed 3 Oct. 2022, U.S. Provisional Application Ser. No. 63/285,650, filed 3 Dec. 2021, and/or U.S. application Ser. No. 17/474,591, filed 14 Sep. 2021, each of which is incorporated herein in its entirety by this reference.

In variants, two distinct and/or at least partially disjoint sets of features can be determined in S120 (e.g., serially, concurrently, contemporaneously, in parallel, etc.), where the two (at least partially disjoint) sets of features can be separately utilized for personalized and global DvP classification by the personalized and global DvP models, respectively. As an example, the personalized DvP model may ingest behavioral/activity-based features (e.g., which may vary between users), whereas the global model may rely upon statistical characterizations in-trip motion characteristics (e.g., for a population of users, characterizing common actions such as vehicle entry/egress, user and/or device mobility relative to the vehicle, etc.). Alternatively, the same sets of features may be utilized for classification in S130 (e.g., with one or both of the personalized and global DvP models), and/or any other suitable set(s) of features can be determined.

Features are preferably generated at a local processor of the mobile device but can alternatively be generated at a remote processor and/or at any other suitable processing endpoint. In one variant, all features can be generated locally at the user device. Features can be generated/updated: continuously (e.g., during a trip), periodically, aperiodically, in response to satisfaction of a trigger condition (e.g., time trigger, speed threshold, etc.), during a vehicle trip (e.g., during movement of the mobile device within a vehicle, between detection of a vehicle trip and satisfaction of a trip termination condition), and/or with any other suitable timing.

In variants, sensor data used to generate features can optionally be filtered using integrated hardware and/or software, such as to remove signal noise, inaccurate data (e.g., remove low accuracy GPS data, etc.), anomalous data (e.g., statistical outliers, associated with a static mobile device, associated with a user manipulating a mobile device, etc.), and/or other data. However, features can be generated using unfiltered, pre-filtered data, and/or any other suitable data.

In an example, the sensor data collected during S110 includes descriptive (user-identifying) data for the user of the mobile device, wherein extracting features includes transforming the descriptive user-identifying data into a set of non-descriptive feature parameters.

However, any other suitable features can be extracted and/or generated.

Determining a classification result based on the extracted features S130 functions to determine if the user is a driver or a passenger. Additionally or alternatively, S130 can function to classify and/or semantically label a vehicle trip for a user. The classification result is preferably determined locally (e.g., at the mobile device) and/or using a model stored locally on the mobile user device, alternatively be determined remotely and/or using a remotely stored model (s). S130 can include: optionally qualifying a DvP model; generating a prediction for the trip (e.g., personalized DvP model); and determining a classification result for the trip based on the prediction. S130 can optionally include generating a baseline prediction for the trip using a global model. However, S130 can include any other suitable elements.

Figure 3:
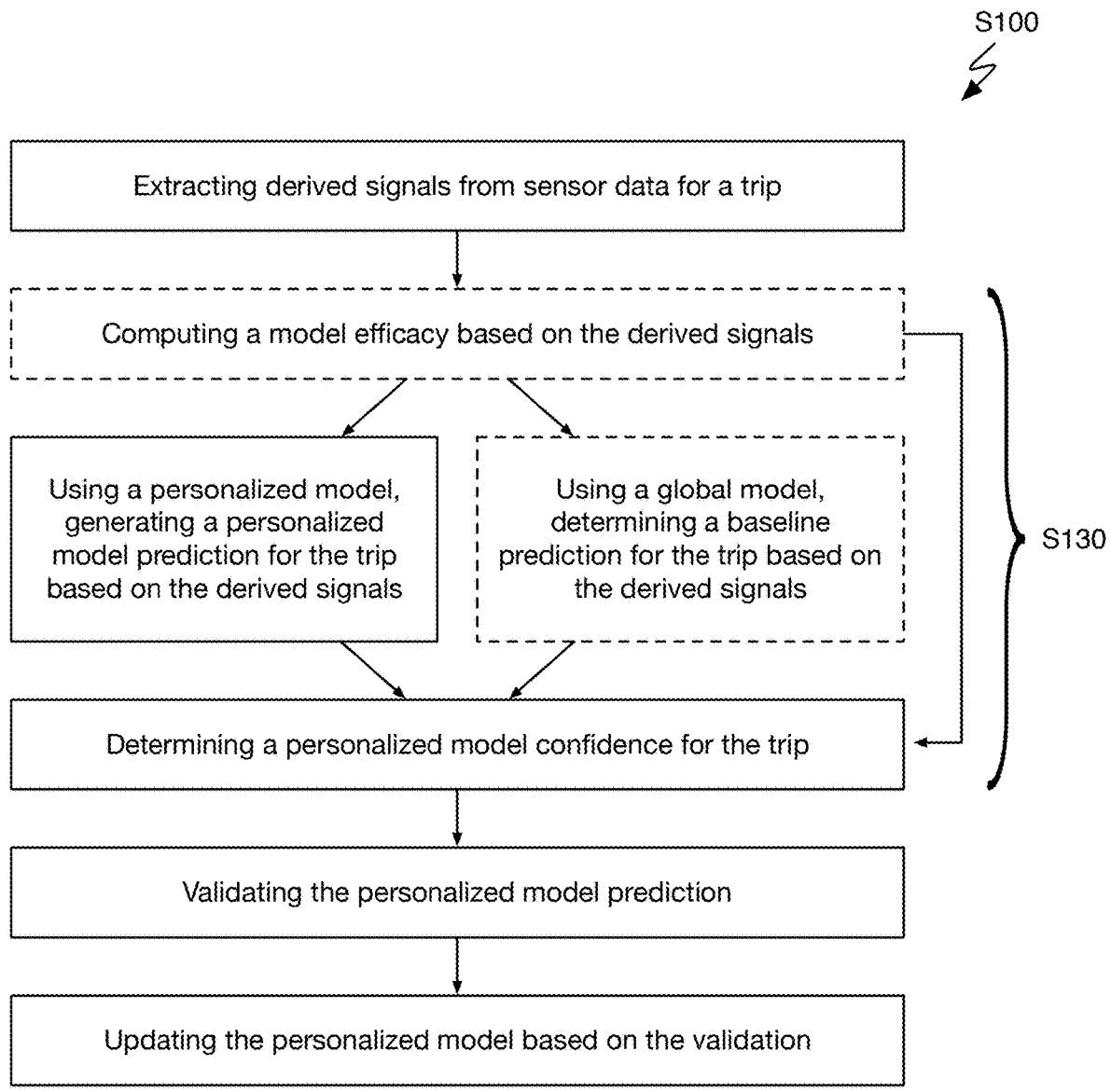
FIG. 3 is an example flow chart diagram for a variant of the method.
Figure 4:
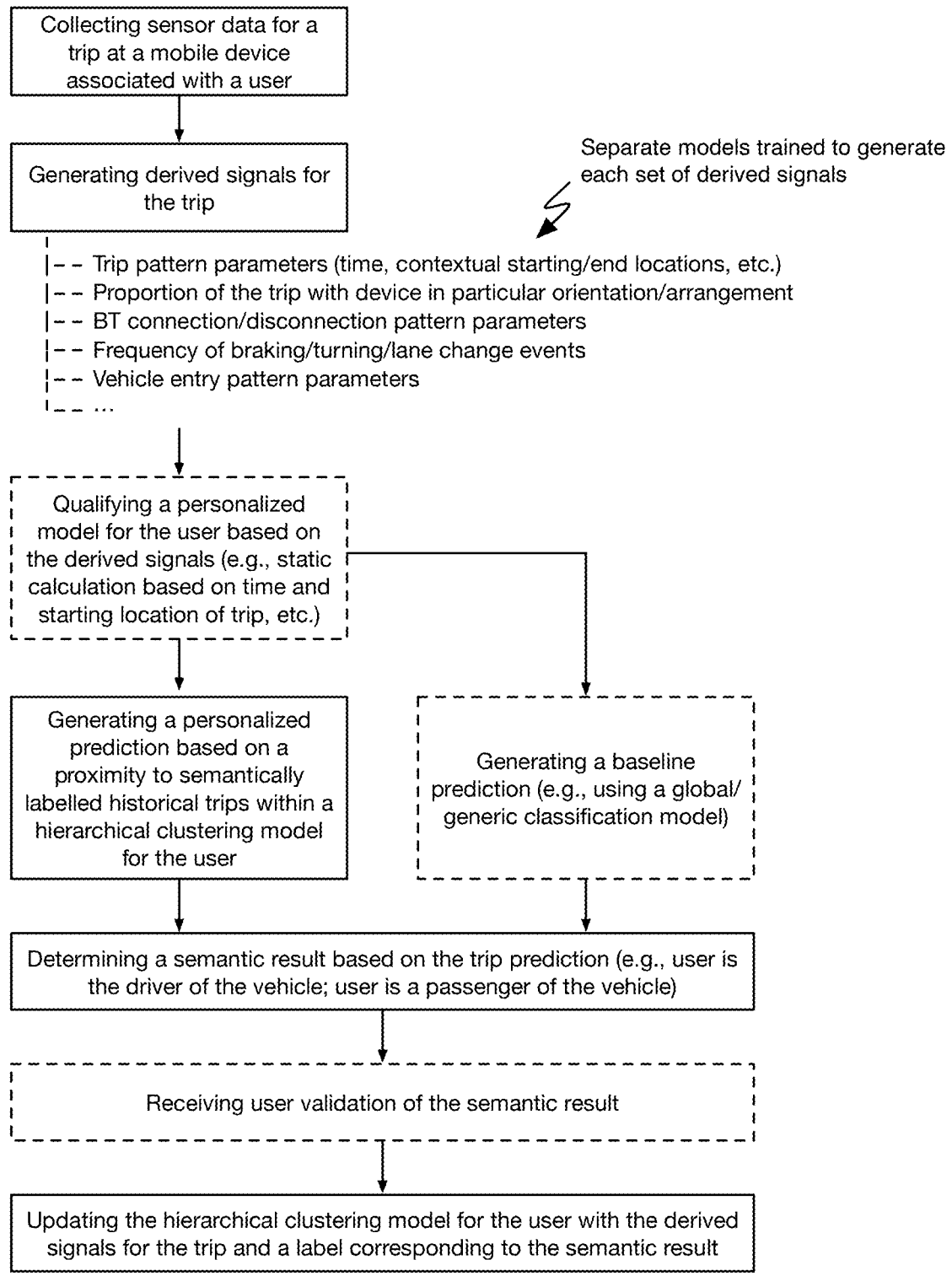
FIG. 4 is an example flow chart diagram for a variant of the method.
Figure 5:
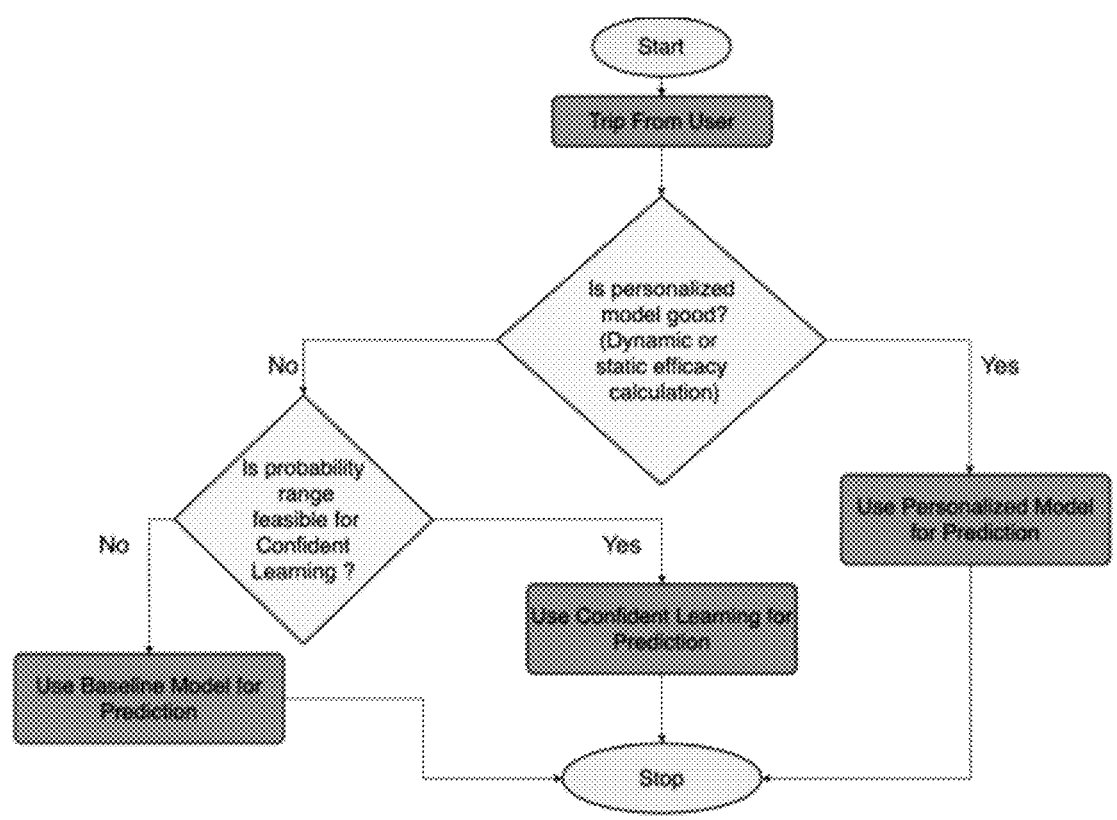
FIG. 5 is a process flow diagram for model selection in one or more variants of the method.

Optionally qualifying a (personalized) DvP model functions to determine an efficacy/appropriateness of a (personalized) DvP model for classification of the trip. A DvP model can be qualified based on any suitable set of rules, heuristics, or tests. In variants, a DvP model can be qualified based on an efficacy calculation (examples are shown in FIG. 3 and FIG. 4), such as by computing a model efficacy score based on a density and/or accuracy of historical classifications. For example, a DvP model can be qualified based on: a detection accuracy satisfying a predetermined threshold (e.g., historical accuracy of the model, historical accuracy of the model within a particular N-dimensional regime of feature domain; in proximity to the trip features in cluster space, etc.), a size of a model training dataset (e.g., number of trips stored in a clustering model; in proximity to the trip features in cluster space), density of historical user data (or model training data; cluster density), a similarity condition between distinct classes/labels (e.g., distance between clusters corresponding to distinct labels in a clustering model), a dynamic accuracy check (e.g., based on the extracted features for a particular trip; based on cluster accuracy and/or density within a cluster model), a static filter for trip pattern parameters (e.g., location of a trip endpoint, time of trip, length of trip in space/time dimensions, etc.), and/or any other suitable qualification metrics/tests. A DvP model can be qualified: for a particular trip (e.g., based on the features), for a particular user (e.g., once, repeatedly, etc.), and/or with any other suitable incidence/timing. As an example, a personalized DvP model can be qualified in response to a static efficacy calculation for the trip features satisfying a predetermined threshold (e.g., an example is shown in FIG. 5). As a second example, a global DvP model can be qualified in response to a qualification failure (a.k.a., disqualification) of a personalized DvP model. As a third example, both a personalized DvP model (e.g., user-specific) and a global DvP model (e.g., not user-specific) can be qualified for a particular trip and can be cooperatively used to determine a classification result for the trip. As a fourth example, a second DvP model (e.g., global model) can be qualified based on a classification probability/confidence of a first DvP model (e.g., personalized model) prediction falling below a predetermined threshold value. As a fifth example, a joint (classification) probability of the personalized and global DvP models can be used to qualify (or disqualify) a prediction.

For example, where the personalized DvP model comprises a cluster model (such as a hierarchical cluster model), some clusters may have relatively high density and accuracy (e.g., where a user consistently exhibits the same sorts of behaviors associated with the extracted features), whereas other clusters may have low density (e.g., where few prior trips exist) and/or inconsistent/lower-accuracy trip classifications (e.g., where a user may exhibit the same type of behavioral patterns associated with the extracted features in both a driver and passenger role; where users may exhibit less consistent/habitual behaviors, which may disqualify the personalized model).

However, a DvP model can alternatively be used without qualification, and/or model qualification may be neglected for one or more iterations of S100.

Determining a prediction for the trip (e.g., after qualifying the personalized model for the trip) functions to facilitate a trip classification based on the extracted features. The prediction can include: a label (e.g., semantic label), classification identifier (e.g., ID/index corresponding to "driver" or "passenger", etc.), a classification probability or confidence score (e.g., for the trip, for a portion of the trip, for an individual feature, etc.), and/or any other suitable elements. The prediction is preferably determined using one or more DvP models, which can include: a binary classifier, a multi-class classifier, a clustering model (e.g., hierarchical clustering model), a regression model, a neural network model (e.g., DNN, CNN, RNN, etc.), a cascade of neural networks, an ensemble of neural networks, compositional networks, Bayesian networks, Markov chains, predetermined rules, probability distributions, heuristics, probabilistic graphical models, and/or other models.

In some variants, a personalized DvP model which is pretrained/generated for a particular user (and/or user profile registered to the mobile device) can be used to generate the prediction based on their personal user history (e.g., vehicle history; driving and/or riding history; based on a user profile; etc.). More specifically, a personalized DvP model can be a hierarchical clustering model which is personalized to the user (e.g., where trip parameters such as time and/or location can be at a top level and/or function as an initial filter) from the features extracted from their historical trips. As an example, a hierarchical clustering model can generate a classification prediction based on the labels of proximal trips in cluster space (e.g., N nearest neighboring trips based on relative proximity of the corresponding feature values; evaluated against trips within a relative proximity of a set of feature values, etc.). As a second example, the hierarchical clustering model includes labels for each of a set of historical vehicular trips arranged in cluster space based on parameter values for each of the features, wherein the historical vehicular trips include: historical driving trips and historical passenger trips.

In some variants, a DvP model can generate a baseline prediction independent of a user history and/or using a global DvP model (a.k.a. baseline model) by the techniques described in U.S. application Ser. No. 16/022,120, filed Jun. 28, 2018, which is incorporated herein in its entirety by this reference. In one example, a global DvP model can be used to populate a user history for a personalized DvP model. In a second example, a global DvP model can be used where the personalized DvP model fails an efficacy condition for a particular trip (e.g., where the features are insufficient to differentiate between a set of clusters with different labels). In a third example, a global DvP model can be used to validate and/or increase the confidence/accuracy of personalized DvP model predictions. In a fourth example, a global DvP model and a personalized DvP model can be cooperatively used to classify a trip (e.g., based on a joint probability). Alternatively, a global DvP model may not be utilized for various instances or iterations of S100.

Determining a classification result for the trip functions to classify and/or label the trip, which can be used to trigger an action (e.g., in accordance with Block S150) and/or update a personalized DvP model (e.g., in accordance with S160). In a first variant, the prediction or label thereof can be directly taken as the classification result (e.g., for a qualified DvP model, etc.). In a second variant, a classification result can be determined from a plurality of predictions, each corresponding to a respective DvP model, according to one or more: decision trees (e.g. a unified tree-based model which integrates a personalized DvP model and a global DvP model), predetermined rules, probability distributions, heuristics, probabilistic graphical models, and/or other models. As an example, a personalized DvP model and a global DvP model can generate a first and second prediction, respectively, which can cooperatively be used to generate the classification result (e.g., where the classification probabilities of the predictions are weighted based on the relative accuracy of the respective DvP models).

The classification with the personalized and global DvP model(s) can ingest the same set of features and/or different (at least partially) disjoint sets of features. In an example, classifying the vehicle trip includes determining a first classification probability with the DvP model with a first subset of the features and a second classification probability with the global model with a second subset of the features, wherein the first and second subsets are disjoint.

However, a classification result can be otherwise suitably determined; and/or the method can determine any other suitable classification result.

Validating the classification result S140 functions to confirm/validate the role of the user (e.g., to facilitate accurate content provision, etc.) and/or to provide supervised (semi-supervised) training data which can be used to update the personalized (DvP) model in accordance with Block S160. The classification result is preferably validated or invalidated by the user (e.g., at the mobile device; based on user feedback; etc.), but can additionally or alternatively be validated by a secondary classifier (e.g., a global classifier; supplemental classifier/model; based on in-trip sensor data/features and/or extra-trip sensor data/features; an example is shown in FIG. 7), remote validation system, third party, a remote operator, and/or other entity. In a specific example, a classification result can be validated by presenting a semantic trip label to the user (or a corresponding semantic query) and receiving feedback at a user device (e.g., the mobile device associated with the user/trip).

However, the classification result can be otherwise suitably validated; or a classification result may otherwise not be validated (e.g., prior to updating the model).

Triggering an action based on the classification result S150 functions to facilitate provision of user content and/or mobile device services based on the classification result (e.g., driving activity, passenger/riding activity) of the user. In variants, user content can include: navigational assistance, arrival time estimation assistance, insurance services (e.g., behavior-based driver insurance, usage-based driver/vehicle insurance, etc.), travel assistance (e.g., ride-share assistance, etc.), vehicle-related advertising (e.g., maintenance services, private/ride-sharing transportation service advertising, etc.), collision assistance, and/or any other suitable content. Content can be provided via the mobile device (e.g., via a device API) and/or external systems. However, any other suitable content can be otherwise provided based on the result, or else may be altogether not provided to the user. Additionally, any other suitable actions can be triggered based on the result, such as, but not limited to: updating a risk score associated with a driver of the vehicle based on driving behavior detected during the trip, updating a personalized DvP classification model (e.g., in accordance with Block S160), updating a global DvP classification model, and/or any other actions.

In variants, S150 can include updating a usage-based insurance policy based on the classification of the trip. For example, S150 can include (automatically) updating a usage parameter of a usage-based (driver) insurance policy, such as a usage-based automobile insurance policy, for the user based on a driver classification. The usage-based insurance policy can be updated based on the distance (e.g., mileage) and/or duration of the trip, upon completion of the trip (e.g., after completion of the trip and/or classification of the trip) and/or in response to a user confirmation of the trip classification (and/or distance). In a second example, S250 can include: based on the classification result, selectively updating a parameter of one insurance policy (e.g., a usage parameter of a usage-based driver insurance policy) of a plurality of insurance policies associated with the user.

In variants, S150 can include providing driver feedback based on the result, such as updating a driver risk score, providing in-trip driver statistics/parameters, and/or any other suitable characterizations of the user (driver) based on the trip. Additionally or alternatively, S150 can include providing feedback to the driver which neglects/filters out a trip(s) where the user has been classified as a passenger during the trip (e.g., which may avoid penalizing or otherwise influencing characterizations of the user's driving ability based on the user's passenger trips).

In variants, S150 can include providing user feedback (e.g., driver feedback) based on the trip classification (e.g., driving trip, passenger trip), such as a risk score (e.g., such as described in U.S. application Ser. No. 14/566,408, filed Dec. 10, 2014, which is incorporated herein in its entirety by this reference) and/or other driver feedback.

However, any other suitable action can be triggered based on the classification result. Alternatively, no action can be triggered based on the classification result, or actions can be otherwise suitably triggered for the method.

Updating a personalized DvP model for a mobile device user S160 functions to update the personalized DvP model for the user based on the labeled trip result. In variants, the personalized DvP model can be generated and/or pre-trained prior to execution of S100 (e.g., pre-trained for runtime execution of S100), but can additionally or alternatively be re-trained and/or updated after S130 (e.g., based on the classification result). The personalized DvP model can be updated: periodically, aperiodically, in response to receipt of validation feedback from a user (e.g., via Block S140), in response to a supplementary/auxiliary classification (or validation/invalidation) by a supplementary model, based on (or in response to) validation of the classification result in S140, and/or with any other suitable timing/frequency. The personalized DvP model can be trained and/or updated based on supervised, semi-supervised, and/or unsupervised learning techniques, and/or can be otherwise suitably trained/updated. For example, the global DvP model and/or a supplementary DvP model (e.g., based on a direction of vehicle egress; extra-trip DvP classification) can be used to update the personalized DvP model for a particular user or user profile in by an unsupervised and/or semi-supervised learning approach (e.g., based on validation accordance with block S140). The personalized DvP model can be updated locally (e.g., at the mobile device) and/or at a remote processing or data storage endpoint (e.g., remote server, cloud processing, etc.). In a specific example, updating the personalized DvP model can include updating a clustering model (e.g., hierarchical clustering model) to include the labeled trip, arranged in cluster space based on the extracted features (e.g., values of each parameter).

The personalized DvP model can be updated based on: a classification probability satisfying an update condition (e.g., a joint probability threshold; static threshold; dynamic threshold based on a density/accuracy of a local cluster space; etc.), based on a supplementary classification (e.g., based on a supplementary model, such as a vehicle egress direction model; based on supplementary/extra-trip features and/or supplemental data surrounding the trip; etc.); based on a user validation/input (e.g., where a user confirms or overrides a trip classification, such as via an input at the mobile device); and/or based on any other suitable information/conditions.

In one set of variants, wherein the features comprise in-trip features associated with a first time period of vehicle traversal, updating the personalized DvP model includes: determining supplementary features based on a second time period after the first time period (and/or device sensor data collected during the second time period); with a supplementary model, determining a supplementary classification probability; and in response to the supplementary classification probability satisfying a threshold, automatically updating the personalized DvP model with the classification and the in-trip features. In an example, the supplementary classification probability is based on a directional classification of user egress from the vehicle during the second time period.

However, the personalized model can be otherwise suitably updated. Alternatively, the personalized model can be unchanging, unmodified, or may not be updated during any suitable interval(s).

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for mobile driver-versus-passenger classification, comprising:
   collecting coarse sensor data with a mobile device associated with a user;
   detecting a first vehicle trip based on the coarse sensor data;
   extracting a first set of features from the coarse sensor data for the first vehicle trip;
   providing the extracted first set of features to a tree-based model to generate a first trip classification during the first vehicle trip, wherein:
     the tree-based model comprises a personalized driver-versus-passenger (DvP) model and a global DvP model, and
     the personalized DvP model comprises a hierarchical clustering model for the user of the mobile device, trained based on historical vehicular trips completed by the user;
   in response to the first trip classification, triggering an action at the mobile device;
   determining a second set of features from sensor data collected with the mobile device during a second vehicular trip;
   based on the second set of features, disqualifying the personalized DvP model;
   in response to disqualify the personalized DvP model, providing the second set of features to the global DvP model to generate a second trip classification during the second vehicular trip, wherein the global DvP model is operable to generate the second trip classification in the event the personalized DvP model has been disqualified, thereby enabling the second trip classification to be produced; and retraining the personalized DvP model with the second set of features and the second trip classification, thereby increasing an alignment of the personalized DvP model with a driving history of the user.

2. The method of claim 1, wherein providing the extracted first set of features to the tree-based model to generate the first trip classification during the first vehicle trip, comprises determining a first classification probability with the personalized DvP model with a first subset of the first set of features and a second classification probability with the global DvP model with a second subset of the first set of features, wherein the first and second subsets are disjoint.

3. The method of claim 1, wherein the hierarchical clustering model comprises labels for each of the historical vehicular trips arranged in cluster space based on parameter values for each of the first set of features, wherein the historical vehicular trips comprise: historical driving trips and historical passenger trips.

4. The method of claim 1, further comprising retraining the personalized DvP model based on the first trip classification and the first set of features, wherein the first set of features comprise in-trip features associated with a first time period of vehicle traversal, wherein retraining the personalized DvP model comprises:

determining supplementary features based on a second time period after the first time period;

with a supplementary model, determining a supplementary classification probability; and in response to the supplementary classification probability satisfying a threshold, retraining the personalized DvP model with the first trip classification and the in-trip features.

5. The method of claim 4, wherein the supplementary classification probability is based on a directional classification of user egress from a vehicle during the second time period.

6. The method of claim 1, wherein the global DvP model comprises a machine-learning-based classifier which is pre-trained using historical data from a plurality of users.

7. The method of claim 1, wherein the sensor data comprises descriptive user-identifying data for the user of the mobile device, wherein extracting the first set of features comprises transforming the descriptive user-identifying data into a set of non-descriptive feature parameters.

8. The method of claim 1, further comprising provisioning, at the mobile device, user content based on the second trip classification.

9. The method of claim 1, wherein the second trip classification comprises a classification of the user as a driver, and the method further comprises providing driver feedback at the mobile device based on the second trip classification.

10. A method, comprising:

determining a first set of features from sensor data collected with a mobile device during a first vehicular trip;

qualifying a personalized model associated with a user profile registered to the mobile device, wherein the personalized model is trained based on labeled historical vehicular trips associated with the user profile;

providing the first set of features to the personalized model to generate a personalized prediction during the first vehicular trip;

determining a first classification result for the first vehicular trip based on the qualification of the personalized model and the personalized prediction;

triggering an action at the mobile device based on the first classification result;

determining a second set of features from sensor data collected with the mobile device during a second vehicular trip;

based on the second set of features, disqualifying the personalized model;

providing the second set of features to a global model to generate a second classification result during the second vehicular trip, wherein the global model is operable to generate the second classification result in the event the personalized model has been disqualified, thereby enabling the second classification result to be produced; and retraining the personalized model with the second set of features and the second classification result, thereby increasing a specificity of the personalized model to the user profile.

11. The method of claim 10, wherein the action comprises a driver feedback provision, and wherein the personalized model is retrained based on driver-input feedback prompted by the driver feedback provision.

12. The method of claim 10, wherein to generate the first classification result, comprises determining a global prediction for the first vehicular trip using a global prediction model, wherein the first classification result is based further on the global prediction model.

13. The method of claim 10, wherein the personalized model comprises a hierarchical clustering model.

14. The method of claim 13, wherein the hierarchical clustering model comprising labeled historical vehicular trips arranged in cluster space based on parameter values for each feature of the first set of features and the second set of features.

15. The method of claim 10, wherein qualifying the personalized model comprises determining satisfaction of a model efficacy score threshold.

16. The method of claim 10, wherein the first classification result for the first vehicular trip comprises a binary classification associated with an activity of a user associated with the user profile during the first vehicular trip.

17. The method of claim 16, further comprising, classifying the first vehicular trip as a roadway driving trip, wherein the personalized model comprises a binary classifier for roadway driving trips configured to distinguish between whether the user associated with the user profile is a vehicle driver or a vehicle passenger for the roadway driving trip.

18. The method of claim 10, further comprising: determining a third set of features from the sensor data collected with the mobile device during the second vehicular trip, wherein the second and third sets of features are disjoint, wherein the global model comprises a tree-based classifier, wherein the second classification result is determined with the tree-based classifier using the third set of features.

19. The method of claim 14, wherein retraining the personalized model further comprises arranging the labeled historical vehicular trips in cluster space based on values of further sets of features, wherein the personalized model outputs classifications based on labels of proximal historical vehicular trips in cluster space.

20. The method of claim 10, further comprising iteratively improving an accuracy of the personalized model for the user profile over time by:

determining further sets of features from sensor data collected during additional vehicle trips;

determining additional classification results for the additional vehicle trips with the global model and the personalized model; and retraining the personalized model, comprising: validating the additional classification results determined with the personalized model against the additional classification results determined with the global model, and updating the personalized model to include the additional classification results determined with the global model.

* * * * *